UNITED STATES PATENT OFFICE.

LOWELL H. MILLIGAN, OF NEW KENSINGTON, PENNSYLVANIA, ASSIGNOR TO ALUMINUM COMPANY OF AMERICA, OF PITTSBURGH, PENNSYLVANIA, A CORPORATION OF PENNSYLVANIA.

PROCESS FOR PRODUCING GRANULAR ALUMINUM FLUORIDE 1,403,183.      Specification of Letters Patent.      Patented Jan. 10, 1922.

No Drawing.      Application filed January 19, 1921. Serial No. 438,446.

*To all whom it may concern:*

Be it known that I, LOWELL H. MILLIGAN, a citizen of the United States, and a resident of New Kensington, in the county of Westmoreland and State of Pennsylvania, have invented a new and useful Improvement in Processes for Producing Granular Aluminum Fluoride, of which the following is a specification.

The object of this invention is to provide a process whereby substantially pure aluminum fluoride of granular or crystalline, non-adherent form may be rapidly, inexpensively and otherwise efficiently recovered or produced from a solution of aluminum fluoride.

Quite pure solutions of aluminum fluoride may be prepared by treating with hydrofluoric acid aluminous minerals, such as kaolin, clay, bauxite, feldspar, leucite, etc., which are preferably although not necessarily calcined. The acid reacts with the mineral to form a solution containing aluminum fluoride and hydrofluosilicic acid, and when more clay or other reactive mineral is added the hydrofluosilicic acid in the solution is further decomposed to produce a precipitate of silica and more aluminum fluoride in the solution. The reactions which may here take place, using clay as an example, may be represented as follows:

(1) 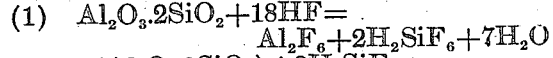
$Al_2O_3 \cdot 2SiO_2 + 18HF = Al_2F_6 + 2H_2SiF_6 + 7H_2O$ (2) 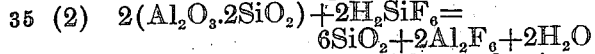
$2(Al_2O_3 \cdot 2SiO_2) + 2H_2SiF_6 = 6SiO_2 + 2Al_2F_6 + 2H_2O$ The second reaction, which results in a substantially pure aluminum fluoride solution, is practically complete only when the solution is neutral to indicators such as tropaolin paper, so that it is necessary to carry the reaction to this point to reduce the amount of silica in the solution. If other impurities such as iron, titanium, etc., are present in solution, they may also be partly precipitated with the silica and, together with it and the residual mud, may be filtered or otherwise separated from the aluminum fluoride solution.

It is my belief that when the solution is neutral to indicators such as tropaolin paper, it contains acid equivalent to the aluminum in the solution, plus, of course, the small amount of other metals present. When the solution is acidic to such indicators it contains acid in excess of that equivalent to the aluminum present in the solution.

When such a neutral aluminum fluoride solution is heated, crystals are deposited having approximately the composition $Al_2F_6 \cdot 7H_2O$. However, instead of precipitating rapidly and in granular form, the crystals come down slowly as a hard rock-like cake, which adheres tenaciously to the bottom and walls of the vat or other containing vessel, and is very difficult to remove. Also, the maximum yield of crystals may be obtained, if at all, only by a prolonged period of heating.

My invention is predicated upon my discovery that, when free acid in properly regulated proportions is present in an aluminum fluoride solution and the solution is heated, aluminum fluoride crystals of approximately the above described composition precipitate rapidly and come down in a granular form which can be easily removed from the containing vessel and readily separated from the mother liquor. The excess acid prevents the precipitation of aluminum fluoride crystals as a hard rock-like cake and greatly accelerates its precipitation in a granular form.

In the practice of the invention the aluminum fluoride solution may be prepared in any desired manner, but is preferably formed as previously explained with reference to equations 1 and 2. The excess of acid may be added to a neutral aluminum fluoride solution, or, when otherwise prepared, such solution may contain an excess of acid and be used directly in the process. While various acids other than hydrofluoric may be added or be otherwise present in the solution to produce an amount of acid in the solution in excess of that equivalent to the aluminum present in the solution, it is preferred, for practical and economic advantages presently to be explained, to use hydrofluoric acid, and it is with respect to the use of such acid that the invention will be specifically described.

As a specific example of the preferred manner of practicing the invention, a clear neutral solution of aluminum fluoride may be first prepared by the reaction between a fourteen per cent solution of hydrofluoric acid and calcined clay. To such solution, sufficient strong hydrofluoric acid is added to cause aluminum fluoride crystals to precipitate in a granular non-adherent form when the solution is heated. It has been found in practice that such precipitation may be best obtained when from about 20 to 30 grams of free hydrofluoric acid are present in a liter of solution, although very good results may be obtained when from about 10 to 40 grams per liter are present. Either too low or too high a free acid content decreases the rate of precipitation, and does not so effectively prevent the formation of a hard cake. The solution containing the excess acid is then placed in a suitable vessel, such as a lead or wooden tank coated with an acid-resisting varnish, and simultaneously agitated and heated to a temperature preferably almost up to the normal boiling point of the solution, that is to say, its boiling point at atmospheric pressure. The heating temperature may be as low as about 60° C., but with the lower temperatures the precipitation is somewhat slower so that a longer period of time is required. Under these conditions, the precipitation of granular aluminum fluoride crystals starts practically immediately, and after a few hours almost all the aluminum fluoride is precipitated. Thus, I have found that a liquor containing 168 grams of aluminum fluoride and 20 grams of free hydrofluoric acid per liter, when heated to a temperature of about 95° C. for three hours, precipitates 85 per cent of the aluminum fluoride as granular non-adherent crystals.

As previously stated, it is preferred to add hydrofluoric rather than other acids to the aluminum fluroide solution. An important advantage incident to the use of hydrofluoric acid is that, after the removal of the crystals, the mother liquor may be fortified by the addition of more hydrofluoric acid and used directly to attack fresh clay. If hydrofluoric acid is used in my process no impurities are thereby introduced into the cycle of operation just mentioned such as will be introduced when acids other than hydrofluoric are employed.

Other acids which may be used in producing granular non-adherent aluminum fluoride crystals are those capable of reacting with the aluminum floride present in the solution to give free hydrofluoric acid, as for example, hydrochloric acid. In practicing the invention, I have added hydrochloric acid to an aluminum fluoride liquor in such proportion that the resulting solution corresponded to 143 grams of aluminum fluoride and 10 grams or hydrochloric acid per liter, and after heating for one hour to a temperature of about 95° C., 62% of the aluminum fluoride was precipitated as granular non-adherent crystals.

The process is intended primarily for the production of substantially pure aluminum fluoride crystals, but it may be used for obtaining aluminum fluoride crystals from solutions containing some impurities, in which case some double salts or other impurities will usually be precipitated with the aluminum fluoride. In general, however, the impurities in the crystals will be less than in the liquor.

According to the provisions of the patent statutes, I have described the principle and operation of my invention, together with specific examples of how it may be practiced. However, I desire to have it understood that, within the scope of the appended claims, the invention may be practiced otherwise than as specifically described herein. For example, the aluminum fluoride solution may be originally obtained in any desired manner and from various sources, the acid in excess of that equivalent to the aluminum in the solution may be either added to a neutral solution or may be present in the original solution, and the amount of acid present may vary from the proportions specifically stated. Furthermore, the heating temperature may be above the boiling point, but to operate at such higher temperatures requires the use of expensive acid-proof pressure-resisting autoclaves.

I claim:

1. The process of producing granular aluminum fluoride, which comprises heating an aluminum fluoride solution containing free acid in excess of that equivalent to the aluminum present in the solution.

2. The process of producing granular aluminum fluoride, which comprises heating to a temperature not exceeding its normal boiling point an aluminum fluoride solution containing free acid in excess of that equivalent to the aluminum present in the solution.

3. The process of producing granular aluminum fluoride, which comprises heating to a temperature not less than about 60° C. and not exceeding its normal boiling point an aluminum fluoride solution containing free acid in excess of that equivalent to the aluminum present in the solution.

4. The process of producing granular aluminum fluoride, which comprises heating an aluminum fluoride solution containing free hydrofluoric acid in excess of that equivalent to the aluminum present in the solution.

5. The process of producing granular aluminum fluoride, which comprises heating to a temperature of about 95° C. an aluminum fluoride solution containing free hydrofluoric acid.

6. The process of producing granular aluminum fluoride, which comprises heating an aluminum fluoride solution containing not less than about ten grams of free acid per liter of the solution.

7. The process of producing granular aluminum fluoride, which comprises heating to a temperature not exceeding its normal boiling point an aluminum fluoride solution containing not less than about ten grams of free hydrofluoric acid per liter of the solution.

8. The process of producing granular aluminum fluoride, which comprises heating an aluminum fluoride solution containing from about ten to forty grams of free hydrofluoric acid per liter of the solution.

9. The process of producing granular aluminum fluoride, which comprises forming an aluminum fluoride solution by treating an aluminous mineral with hydrofluoric acid until neutral and removing the resulting precipitate, and heating such solution in the presence of hydrofluoric acid in excess of that equivalent to the aluminum present in the solution.

In testimony whereof, I have hereunto set my hand.

LOWELL H. MILLIGAN.

Witnesses:
N. V. B. ZIEGLER,
FRANCIS C. FRARY.